United States Patent
Yadati et al.

(10) Patent No.: US 10,318,554 B2
(45) Date of Patent: Jun. 11, 2019

(54) SYSTEM AND METHOD FOR DATA CLEANSING

(71) Applicant: Wipro Limited, Bangalore (IN)

(72) Inventors: Chetan Narasimha Yadati, Bangalore (IN); Surajit Sen, Bangalore (IN)

(73) Assignee: Wipro Limited, Bangalore (IN)

(*) Notice: Subject to any disclaimer, the term of this patent is extended or adjusted under 35 U.S.C. 154(b) by 380 days.

(21) Appl. No.: 15/246,256

(22) Filed: Aug. 24, 2016

(65) Prior Publication Data
US 2017/0364579 A1    Dec. 21, 2017

(30) Foreign Application Priority Data

Jun. 20, 2016 (IN) .............................. 201641021040

(51) Int. Cl.
| | | |
|---|---|---|
| G06F 17/30 | (2006.01) | |
| G06F 16/28 | (2019.01) | |
| G06F 16/21 | (2019.01) | |
| G06F 17/27 | (2006.01) | |
| G06F 16/30 | (2019.01) | |

(52) U.S. Cl.
CPC .......... *G06F 16/285* (2019.01); *G06F 16/217* (2019.01); *G06F 16/30* (2019.01); *G06F 17/2785* (2013.01)

(58) Field of Classification Search
CPC .............................................. G06F 17/30598
See application file for complete search history.

(56) References Cited

U.S. PATENT DOCUMENTS 6,205,261 B1    3/2001  Goldberg
6,751,621 B1 *  6/2004  Calistri-Yeh ...... G06F 17/30731
(Continued)

FOREIGN PATENT DOCUMENTS

JP    2016001399 A  *  1/2016

OTHER PUBLICATIONS

Xiaozhong Liu, "Proposal of Document Classification with word Sense Disambiguation", *Ideals IConference*, Feb. 26, 2008, URL:https://www.ideals.Illinois.edu/bitstream/handle/2142/15145/p020_iconf08.doc.pdf?sequence=4&isAllowed-y. 6 pages.
(Continued)

*Primary Examiner* — Syed H Hasan
(74) *Attorney, Agent, or Firm* — Finnegan, Henderson, Farabow, Garrett & Dunner LLP

(57) ABSTRACT

System and method for data cleansing are disclosed. The method comprises receiving one or more data records pre-categorized into one or more categories. Identifying at least one concept associated with one or more data records, and grouping, the at least one concept associated with the one or more data records into a plurality of category lists based on the predefined category associated with each of the one or more data records. Determining, one or more intersection sets based on a comparison between each pair of the plurality of category lists, wherein each intersection set comprises a set of one or more common concepts associated with a pair of category lists. The method comprises replacing each of at least one common concept of the set of one or more common concepts associated with each intersection set by a category name based on an occurrence rate of the common concepts.

17 Claims, 5 Drawing Sheets

(56) References Cited

U.S. PATENT DOCUMENTS

| | | | |
|---|---|---|---|
| 6,757,668 B1* | 6/2004 | Goebel | G06K 9/6292 |
| | | | 706/47 |
| 7,308,378 B2 | 12/2007 | Starzyk et al. | |
| 7,689,588 B2 | 3/2010 | Badr et al. | |
| 8,473,279 B2 | 6/2013 | Al-Shammari | |
| 9,171,070 B2 | 10/2015 | Alspector et al. | |
| 9,224,386 B1 | 12/2015 | Weber | |
| 2004/0019601 A1* | 1/2004 | Gates | G06F 17/3071 |
| 2004/0122660 A1* | 6/2004 | Cheng | G06F 17/27 |
| | | | 704/10 |
| 2005/0286772 A1 | 12/2005 | Albertelli | |
| 2006/0247914 A1 | 11/2006 | Brener et al. | |
| 2008/0288493 A1* | 11/2008 | Yang | G06K 9/00335 |
| 2010/0257127 A1* | 10/2010 | Owens | G06N 7/005 |
| | | | 706/12 |
| 2010/0278046 A1* | 11/2010 | Mateos Perez | H04L 45/12 |
| | | | 370/235 |
| 2012/0166441 A1 | 6/2012 | Karidi et al. | |
| 2013/0138428 A1 | 5/2013 | Chandramouli et al. | |
| 2013/0262166 A1* | 10/2013 | Abrams | G06Q 10/00 |
| | | | 705/7.11 |
| 2013/0282704 A1 | 10/2013 | Pantel et al. | |
| 2014/0280178 A1* | 9/2014 | Benyamin | G06F 17/30598 |
| | | | 707/740 |
| 2015/0026105 A1 | 1/2015 | Henrichsen et al. | |
| 2017/0103434 A1* | 4/2017 | Hurwitz | G06Q 30/0601 |
| 2018/0218070 A1* | 8/2018 | Sharma | G06F 17/30707 |
| 2018/0225259 A1* | 8/2018 | Alba | G06F 17/24 |

OTHER PUBLICATIONS

Hwee Tou NG, "Exemplar-Based Word Sense Disambiguation: Some Recent Improvements", Jun. 10, 1997, *ARVIX. ORG., Cornell University Library*, 6 pages.

Xindong Wu, et al., "Mining with Noise Knowledge: Error-Aware Data Mining", *IEEE*, Jul. 2008, vol. 38; No. 4, pp. 917-932.

European Search Report dated Feb. 16, 2017 in counterpart European Patent Application No. 16191846.1, 7 pages.

* cited by examiner

SYSTEM AND METHOD FOR DATA CLEANSING

TECHNICAL FIELD

This disclosure relates generally to data classification and more particularly to a system and a method for improved data cleansing in natural language processing.

BACKGROUND

Data cleansing is an important step in the data mining, text analysis and performing data classification. This is the process of removing noisy, incorrect, improperly formatted and garbage data to achieve higher accuracy in categorizing data. However determining whether a word or concept belongs to noise or if it is important is a very difficult process due to its scale.

For example in a system that classifies different types of news items, the word "crashed" could either mean a software crash, airplane crash or a building crash. However if the news sources are all related to software, then the meaning of the word is clear.

Conventional approaches for data cleansing, may not be accurate as they are not able to detect such words common within different domains.

SUMMARY

In one embodiment, a method of data cleansing is disclosed. The method comprises receiving, by a data categorizer, one or more data records pre-categorized into one or more categories. The method further comprises identifying, by the data categorizer, at least one concept associated with one or more data records. The method further comprises grouping, by the data categorizer, the at least one concept associated with the one or more data records into a plurality of category lists based on the predefined category associated with each of the one or more data records. The method further comprises determining, by the data categorizer, one or more intersection sets based on a comparison between each pair of the plurality of category lists, wherein each intersection set comprises a set of one or more common concepts associated with a pair of category lists. The method still further comprises replacing, by the data categorizer, each of at least one common concept of the set of one or more common concepts associated with the each intersection set by at least one category name based on an occurrence rate of the one or more common concepts.

In another embodiment, a system for data cleansing is disclosed. The system includes at least one processors and a computer-readable medium. The computer-readable medium stores instructions that, when executed by the at least one processor, cause the at least one processor to perform operations comprising, receiving one or more data records pre-categorized into one or more categories. The operations further comprises identifying at least one concept associated with one or more data records. The operations further comprises grouping the at least one concept associated with the one or more data records into a plurality of category lists based on the predefined category associated with each of the one or more data records The operations further comprises determining one or more intersection sets based on a comparison between each pair of the plurality of category lists, wherein each intersection set comprises a set of one or more common concepts associated with a pair of category lists. The operations still further comprises replacing each of at least one common concept of the set of one or more common concepts associated with the each intersection set by at least one category name based on an occurrence rate of the one or more common concepts.

In another embodiment, a non-transitory computer-readable storage medium for data cleansing is disclosed which when executed by a computing device, cause the computing device to perform operations comprising receiving one or more data records pre-categorized into one or more categories. The operations further comprises identifying at least one concept associated with one or more data records. The operations further comprises grouping the at least one concept associated with the one or more data records into a plurality of category lists based on the predefined category associated with each of the one or more data records The operations further comprises determining one or more intersection sets based on a comparison between each pair of the plurality of category lists, wherein each intersection set comprises a set of one or more common concepts associated with a pair of category lists. The operations still further comprises replacing each of at least one common concept of the set of one or more common concepts associated with the each intersection set by at least one category name based on an occurrence rate of the one or more common concepts.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Working of the systems and methods for data cleansing is described in conjunction with FIGS. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
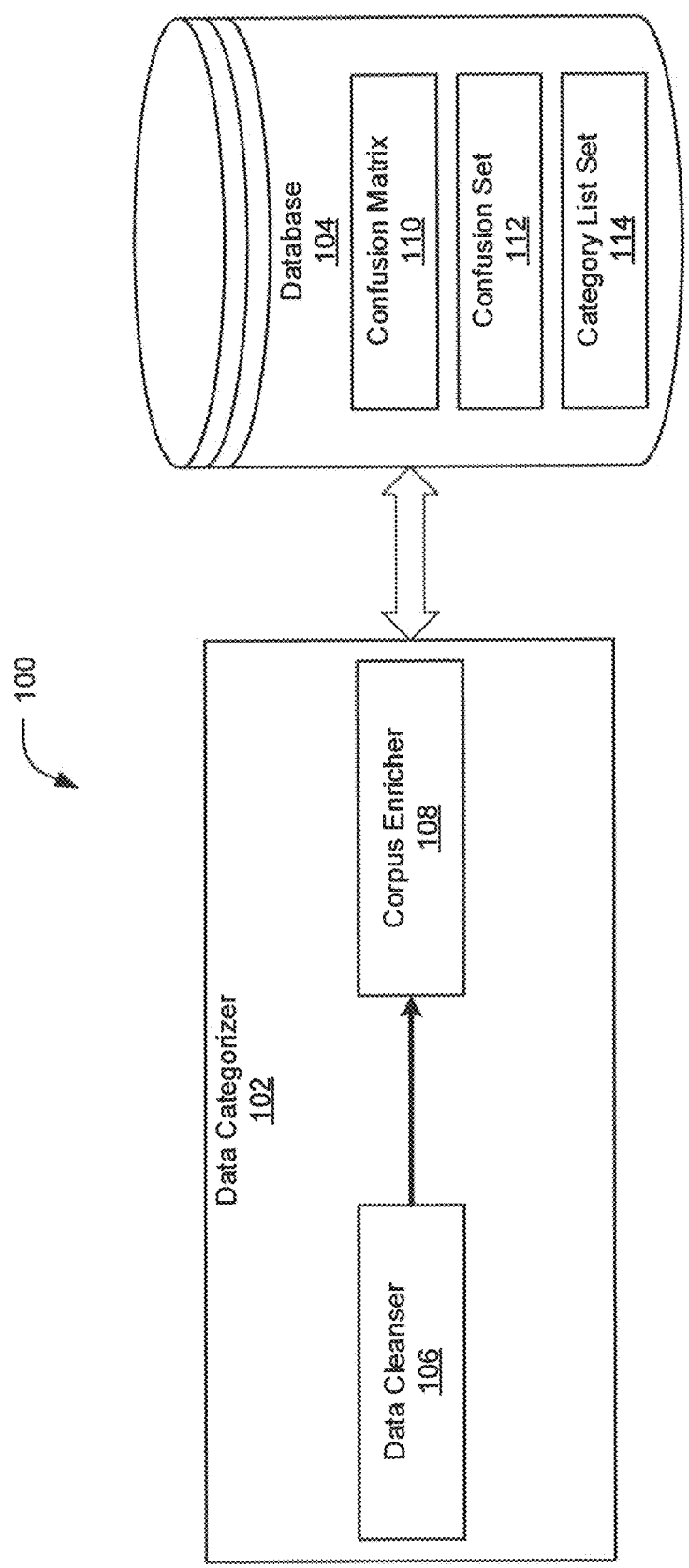
FIG. 1 illustrates an exemplary network environment comprising a data categorizer, in accordance with some embodiments of the present disclosure.

FIG. 1 illustrates an exemplary network environment 100 comprising a data categorizer 102, in accordance with some embodiments of the present disclosure.

As shown in FIG. 1, the data categorizer 102 is communicatively coupled to a database 104. In an example, the database 104 comprises a confusion matrix 110, a confusion set 112 and a category list set 114. In an example the confusion matrix 110 may comprise number of times data records have been miscategorized. In an example, the confusion matrix 110 may be a matrix where the columns denote each of one or more categories as categorized by a classification system, and the rows denote the true each of the one or more categories. An entry $C_{ij}$ in the confusion matrix may imply that $C_{ij}$ number of records may be wrongly classified as category j whereas their true category may be category i. In an example, miscategorized may indicate the data records that have been wrongly categorized. The sentence "Shares of General Motors have declined by 2.5%" may be an example of the data records, which should have been categorized as "Business", but instead it has been categorized as "Cars". Hence there may be a confusion between at least one of the predefined category. In an example, a record $C_{ij}$ with the highest non-diagonal value, may denote most confusion among two categories i and j. In an example, in natural language processing, the one or more categories may comprise politics, movies, business, finance, editorial, cars and sports. In an example one or more data record may comprise at least one concept. In a further example, the at least one concept may comprise a word or a collection words. For brevity, the at least one concept may be interchangeably referred to as the concepts. Again for brevity, the one or more data records may be interchangeably referred to as the data records.

The confusion set 112, may include one or more intersections sets, wherein each intersection set may comprise a set of one or more common concepts between a pair of category lists based on an intersection between the pair of category lists. In an example, each of the plurality of category lists may comprise the concepts, associated with the data records already categorized. For brevity, the one or more intersection sets may be interchangeably referred to as the intersection sets and the each intersection set may be interchangeably referred to as the intersection set. Again for brevity, the set of one or more common concepts may be interchangeably referred to as the common concepts.

The category list set 114, may comprise a collection of the plurality of category lists, and for brevity the plurality of category lists may be interchangeably referred to as the category lists.

Further, the data categorizer 102 may communicate with the database 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

For brevity, the data categorizer 102 may be interchangeably referred to as the system 102. The system 102 may be implemented on variety of computing systems. Examples of the computing systems may include a laptop computer, a desktop computer, a tablet, a notebook, a workstation, a mainframe computer, a server, a network server, and the like. Although the description herein is with reference to certain computing systems, the systems and methods may be implemented in other computing systems, albeit with a few variations, as will be understood by a person skilled in the art.

As shown in FIG. 1, the system 102 comprises a data cleanser 106 and a corpus enricher 108.

In operations, for data cleansing, the system 102, receives training data. In an example, in natural language processing, the training data may comprise 80% of an input data. The remaining 20% may be used for the purpose of testing, and may be denoted as testing data. In another example, the training data may be a data corpus, comprising a collection of the data records.

The system 102 may receive the training data comprising the data records pre-categorized into the one or more categories. For brevity, the one or more categories may be interchangeably used as the categories or the predefined category or the predefined categories or the category.

The data records may be cleansed and categorized. In an example, standard cleansing techniques known in the art may be used to cleanse the data. In a further example, the data records within the corpus may be classified into the categories.

Upon receiving the data records, the data cleanser 106, may identify the concepts within the data records. The sentence "Shares of General Motors have declined by 2.5%" may be an example of the data records, and the concepts may be shares, General Motors and declined.

After identifying the concepts within the data records, the data cleanser 106, may group the concepts comprising the data records into the predefined categories associated with the data records. In an example all the concepts associated with the data records may be grouped together into the category lists, wherein at least one of the category lists may be based on the predefined categories associated with the data records. The sentence "Shares of General Motors have declined by 2.5%" may be an example of the data records and may have been categorized as Business, hence the concepts comprising shares, General Motors and declined may be grouped together in the at least one of the category lists associated with Business. In an example the plurality of category lists may comprise one category list for each category in the predefined categories. The plurality of category lists may be stored in the database 104 in the category list set 114.

Thereafter the corpus enricher 108, may receive the category lists. The corpus enricher 106, may determine the one or more intersection sets based on a comparison between each pair of the category lists. In an example, the each intersection set may comprise the set of one or more common concepts associated with the pair of category lists. In an example intersection between two category lists among the category lists may be determined by the corpus enricher 108, which may be the one or more intersections sets. The each intersection set may comprise the set of one or more common concepts associated with the pair of category lists. In an example, the intersection between each of the two category lists among the category lists may be among the concepts present in the upper approximations of each pair of the category lists. The upper approximations may comprise the concepts that may be present in more than one of the category lists. For brevity, the set of one or more common concepts may be interchangeably referred to as the common concepts.

Upon receiving the common concepts, the corpus enricher 108, may replace each of at least one common concept of the common concepts associated with the intersection set by at least one category name based on the occurrence rate of the each of the common concepts. In an example, the corpus enricher 108, may replace the each of at least one common concept of the common concepts associated with the intersection set by removing the each of at least one common concept of the common concepts associated with the intersection set from the data records. After removing the corpus enricher 108, may append the at least one category name to the data records to bias the system 102 for improving classification for the each of the common concepts removed. For brevity the at least one category name may be interchangeably referred to as the category name.

In an example, each of at least one common concept of the common concepts associated with the intersection set may be replaced by the category name as many times as n-y times, where n represents the number of the predefined category and y represents the occurrence rate, or the number of categories in which the each of at least one common concept of the common concepts associated with the intersection set appear. In a further example, the each of at least one common concept of the common concepts associated with the intersection set may be replaced by the category name in which occurrence frequency of the each of at least one common concept of the common concepts associated with the intersection set is highest. In an example, the occurrence frequency may be the number of times the each of at least one common concept of the common concepts associated with the intersection set occur in each of the category lists. In another example, the category name may comprise politics, movies, business, finance, editorial, cars and sports.

In an example, a largest intersection may be determined by the corpus enricher 108 from the intersection sets. The largest intersection set may comprise a highest number of common concepts. Each of the highest number of common concepts may then be replaced by the category name based on the occurrence rate and the occurrence frequency by the corpus enricher 108.

In another example, the corpus enricher 108 may generate a confusion matrix, and may store the confusion matrix in the confusion matrix 110 in the database 104, for the pre-categorized data records. The corpus enricher 108, may then identify an intersection set with a maximum confusion value from the confusion matrix. The maximum confusion value may correspond to the highest non-diagonal value in the confusion matrix. The each of the at least one concept associated with the intersection set with the maximum confusion may be replaced by the category name based on the occurrence rate and the occurrence frequency.

In a further example, an intensity of confusion value may be assigned to the each intersection set based on the confusion matrix. The corpus enricher 108 may then identify at least one intersection set from the intersection sets having the intensity of confusion value greater than the intensity of confusion value of the largest intersection set. In an example, the intensity of confusion value may be a rank assigned to the intersection sets. The rank may be $$\frac{n!}{2(n-2)!} - p,$$

where n may represent the number of the category lists and p may represent a counter, The counter may be set at a value of 1 for the intersection set with the maximum confusion value. The value of may then be incremented each time to assign the rank to the intersection sets. In an example the ranking may first be assigned to the intersection set with the maximum confusion value and then may be assigned to the intersection set with associated with the next highest value based on the confusion matrix. The corpus enricher 108 may then replace the common concepts associated with the at least one intersection set with the category name based on the occurrence rate and the occurrence frequency.

Thus, the system 102 employs a unique and efficient way of determining the one or more common concepts that causes confusion among and hinders accurate classification. The system 102, further biases the system in a unique way for better classification of the data records. The system 102 has better classification rate than traditional methods of data classification in natural language processing.

The methods 200, 300, and 400 may be described in the general context of computer executable instructions. Generally, computer executable instructions can include routines, programs, objects, components, data structures, procedures, modules, and functions, which perform particular functions or implement particular abstract data types. The methods 200, 300, and 400 may also be practiced in a distributed computing environment where functions are performed by remote processing devices that are linked through a communication network. In a distributed computing environment, computer executable instructions may be located in both local and remote computer storage media, including memory storage devices.

Figure 2:
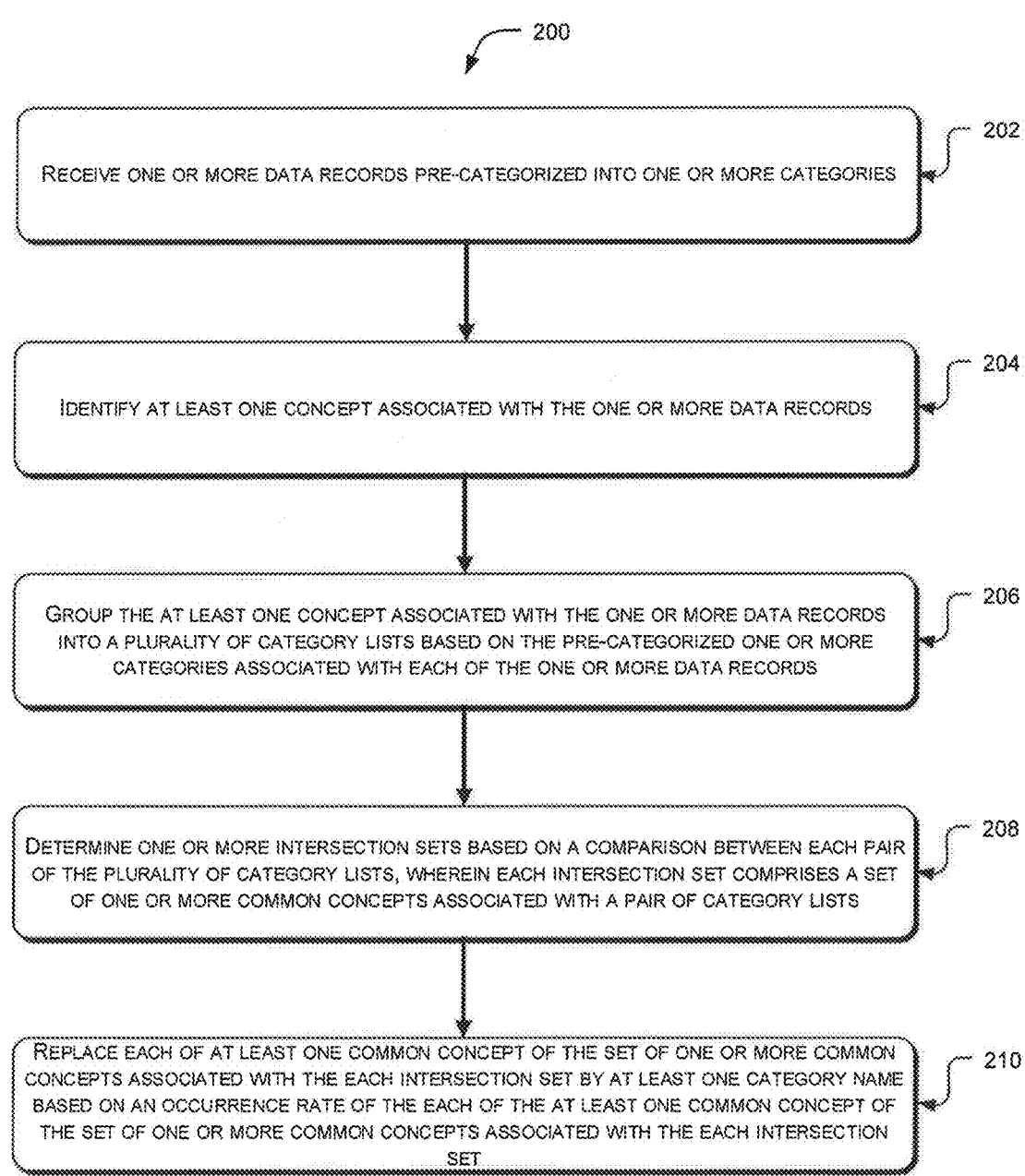
FIG. 2 illustrates an exemplary method for data cleansing, in accordance with some embodiments of the present disclosure.
Figure 3:
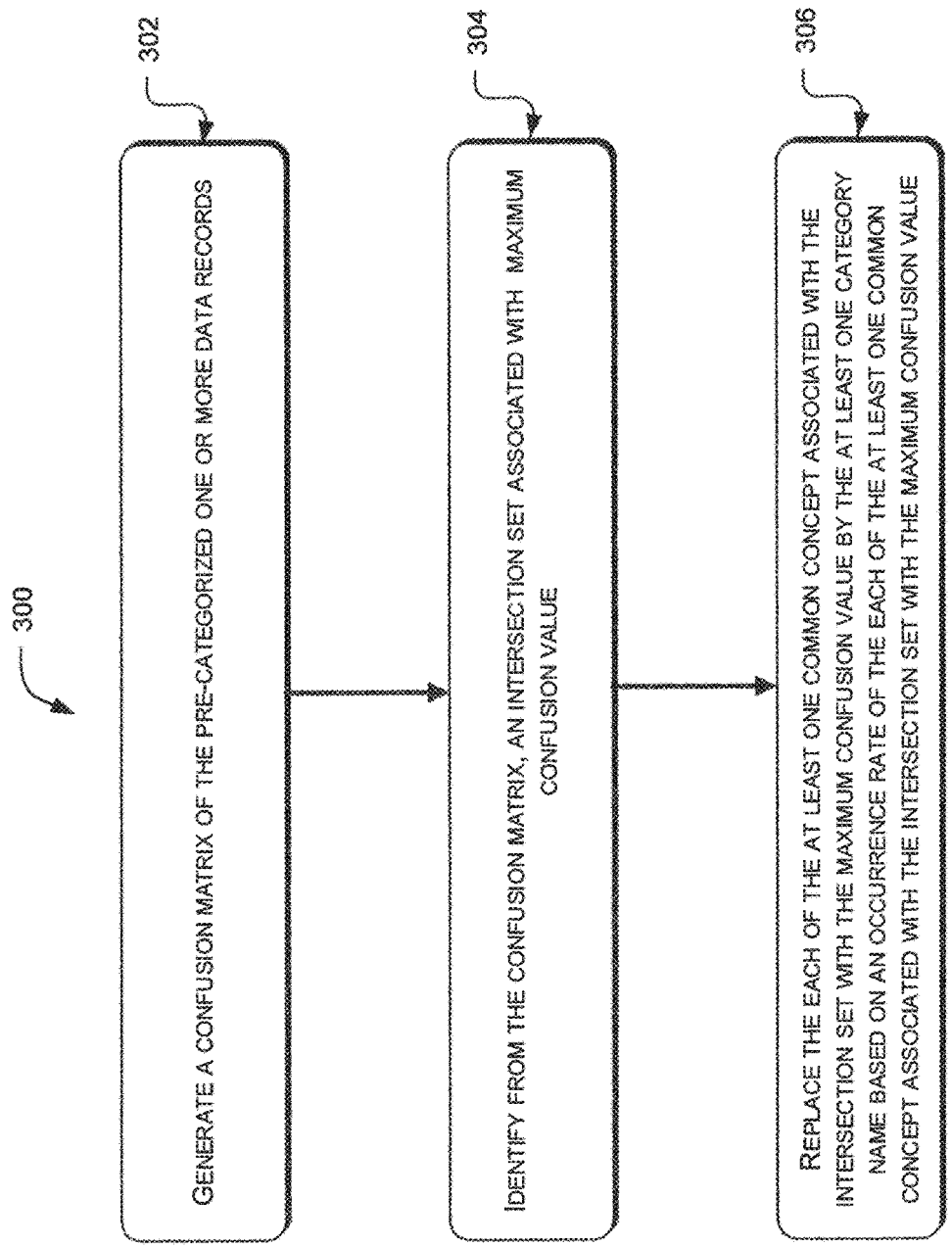
FIG. 3 illustrates an exemplary method of replacing the each of the at least one common concept of the set of one or more common concepts associated with the each intersection set comprises.
Figure 4:
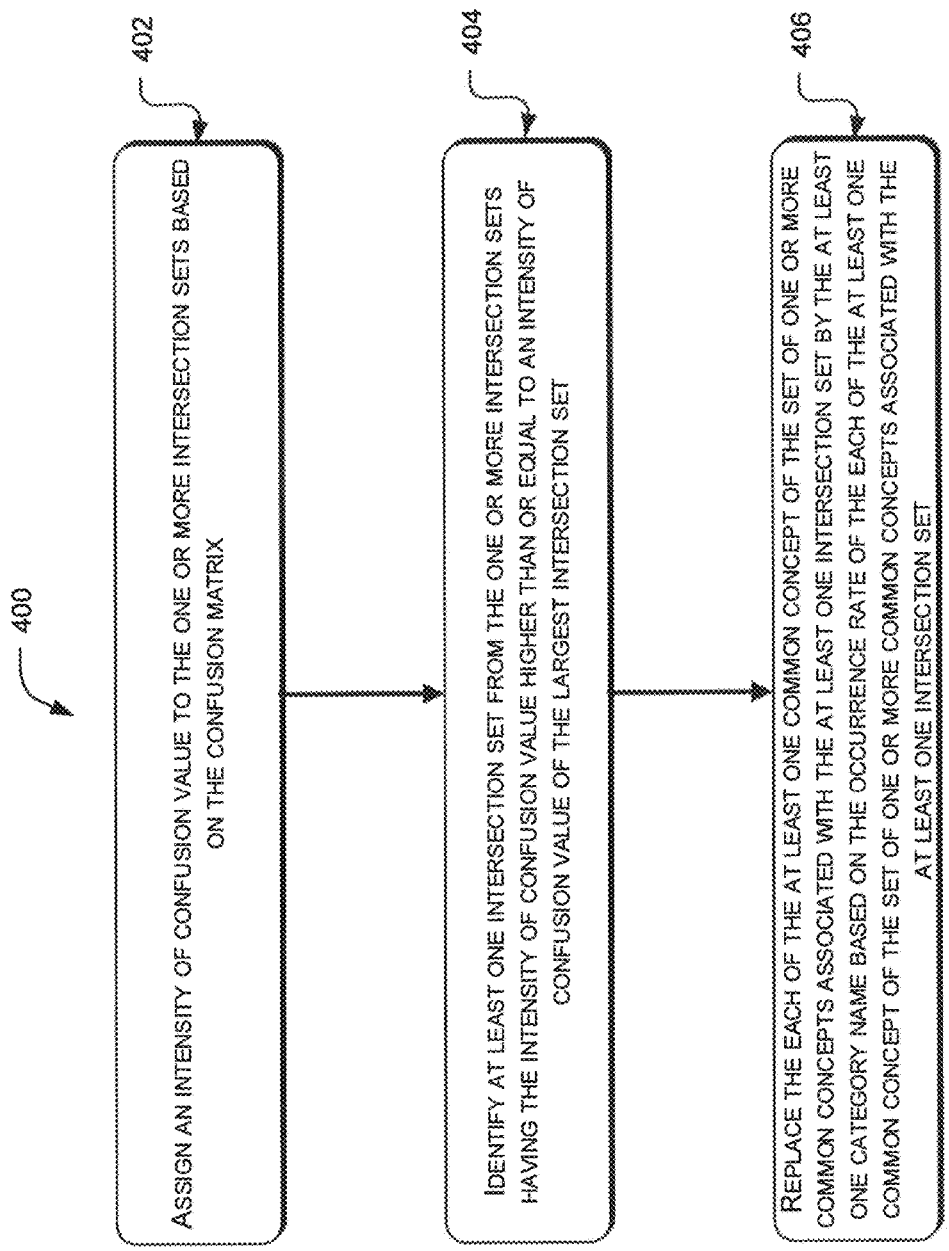
FIG. 4 illustrates an exemplary method of replacing the each of the at least one common concept of the set of one or more common concepts associated with the each intersection set comprises.

Reference is made to FIGS. 2, 3 and 4 the order in which the methods 200, 300 and 400 are described is not intended to be construed as a limitation, and any number of the described method blocks can be combined in any order to implement the methods 200, 300 and 400 or alternative methods. Additionally, individual blocks may be deleted from the methods 200, 300 and 400 without departing from the spirit and scope of the subject matter described herein. Furthermore, the methods 200, 300 and 400 can be implemented in any suitable hardware, software, firmware, or combination thereof.

FIG. 2 illustrates an exemplary method for data cleansing, in accordance with some embodiments of the present disclosure.

With reference to FIG. 2, at block 202, the system 102 may receive one or more data records pre-categorized into one or more categories. For brevity, the one or more categories may be interchangeably referred to as the categories, and the one or more data records may be interchangeably referred to as the data records. The categories may comprise politics, movies, business, finance, editorial, cars and sports.

In an example, the system 102, may receive the data records which may be 80% of input data received. The training data may be used to train a system to classify data during natural language processing. The rest 20% may be termed as testing data, which may be used to test the data classification system to check the accuracy. The training data may comprise a data corpus comprising the data records.

At block 204, at least one concept associated with the data records may be identified. In an example the data records may comprise the concepts. The concepts may be a word or a collection of words.

In an example, the data corpus may be cleansed using cleansing techniques known in the art.

At block 206, the concepts identified by the data cleanser 106, associated with the data records may be grouped into a plurality of category lists based on the pre-categorized one or more categories associated with each of the one or more data records. For brevity, the plurality of category lists may be interchangeably referred to as the category lists. In an example, the concepts associated with the data records may be grouped into the category lists by the data cleanser 106. The sentence "Shares of General Motors have declined by 2.5%" may be an example of data record, and the one or more concepts may be shares, General Motors and declined, and the data record may be categorized as Business. The concepts, shares, General Motors and declined may be grouped in a category list named Business among the category lists. In an example, there may be only one category list among the category lists corresponding to one category among the predefined category, that is for the category Business, there may be only one category list called Business and each one of the at least one concept associated with the one or more data records categorized as Business may be grouped into the category list Business.

At block 208, one or more intersection sets may be determined based on a comparison between each pair of the plurality of category lists, where each intersection set comprises a set of one or more common concepts associated with a pair of category lists. In an example the corpus enricher 108 may determine the intersection between each category list in the category list set 114 with each of the rest of category lists in the category list set 114, which may give the one or more intersection sets. In an example, the each intersection set may comprise the set of one or more common concepts associated with the pair of category lists. In an example, the intersections may be between upper approximations of the category lists. The upper approximation may comprise the concepts that may be present in two or more of the category lists. The set of one or more common concepts may be stored in the confusion set 112 in the database 104. For brevity, the set of one or more common concepts may be interchangeably referred to as the common concepts and the each intersection set may be referred to as the intersection set. Again for brevity, the one or more intersection sets may be referred to as the intersection sets.

At block 210, each of at least one common concept of the common concepts associated with the intersection set may be replaced by at least one category name based on an occurrence rate of the each of the at least one common concept. For brevity, the at least one category name may be interchangeably referred to as the category name. In an example, the corpus enricher 108, may remove the common concepts from the data records. Upon the removing the each of the at least one common concept common concepts, the corpus enricher may append the category name for the each of the at least one common concept as many times as n-y, where n is the total number of categories in the predefined category and y is occurrence rate. The occurrence rate may be the number of the category lists in which the each of the at least one common concept appears. In an example, the name of the predefined category in which occurrence frequency is the highest may comprise the category name to be appended to the one or more data recorded. The occurrence frequency may be number of times the each of the at least one common concept appear in each of the category lists.

The corpus enricher 108 may bias a data classification system for more accurate and improved classification.

In an example, a largest intersection set may be determined from the intersections sets by the corpus enricher 108. The largest intersection set contain a highest number of common concepts. In an example, the highest number of common concepts may be replaced by the category name, based on the occurrence rate and the occurrence frequency. In an example, the largest intersection set among the intersection sets may be a set with highest number of elements. The elements in the largest intersection set may be the highest number of common concepts.

FIG. 3 illustrates an exemplary method of replacing the each of the at least one common concept of the set of one or more common concepts associated with the each intersection set comprises.

At block 302, a confusion matrix of the pre-categorized data records may be generated. In an example, the confusion matrix may contain the number of times each of the data records have been confused among the categories. In an example, each value or entry in the confusion matrix, denotes the number of times pairs of categories may have been confused among each other. The largest non-diagonal entry in the confusion matrix may determine the categories that have been confused most number of times.

At block 304, an intersection set associated with maximum confusion value may be identified from the confusion matrix. In an example, the largest non-diagonal entry in the confusion matrix may determine a pair of the categories that have been confused most number of times.

At block 306, the each of the at least one common concept associated with the intersection set with the maximum confusion value may be replaced by the category name based on the occurrence rate and occurrence frequency of the each of the at least one common concept associated with the intersection set with the maximum confusion value.

FIG. 4 illustrates a method of replacing the each of the at least one common concept of the set of one or more common concepts associated with the each intersection set.

At block 402, an intensity of confusion value may be assigned to the intersection set based on the confusion matrix. In an example the intensity of confusion value may be a rank, which may be equivalent to $$\frac{n!}{2(n-2)!} - p,$$

where p may be a counter, having a starting value of 1 and then being incremented by 1, each time the rank is assigned to the intersection sets and n is the number of the categories. In an example the value p is 1 for the intersection set with the maximum confusion. The value of p may then be incremented each time by 1 for an intersection set with a maximum confusion value after the intersection set with the maximum confusion based on the confusion matrix. The assigning of the intensity of confusion may go on for all the intersection sets.

At block 404, at least one intersection set from the intersection sets may be identified having the intensity of confusion value higher than or equal to an intensity of confusion value of the largest intersection set. In an example, the at least one intersection set may include each of the intersection sets with the intensity of confusion higher than or equal to that if the largest intersection set.

At block 406, the each of the at least one common concept of the common concepts associated with the at least one intersection set may be replaced by the category name based on the occurrence rate and the occurrence frequency of each of the each of the at least one common concept of the common concepts associated with the at least one intersection set.

Computer System

Figure 5:
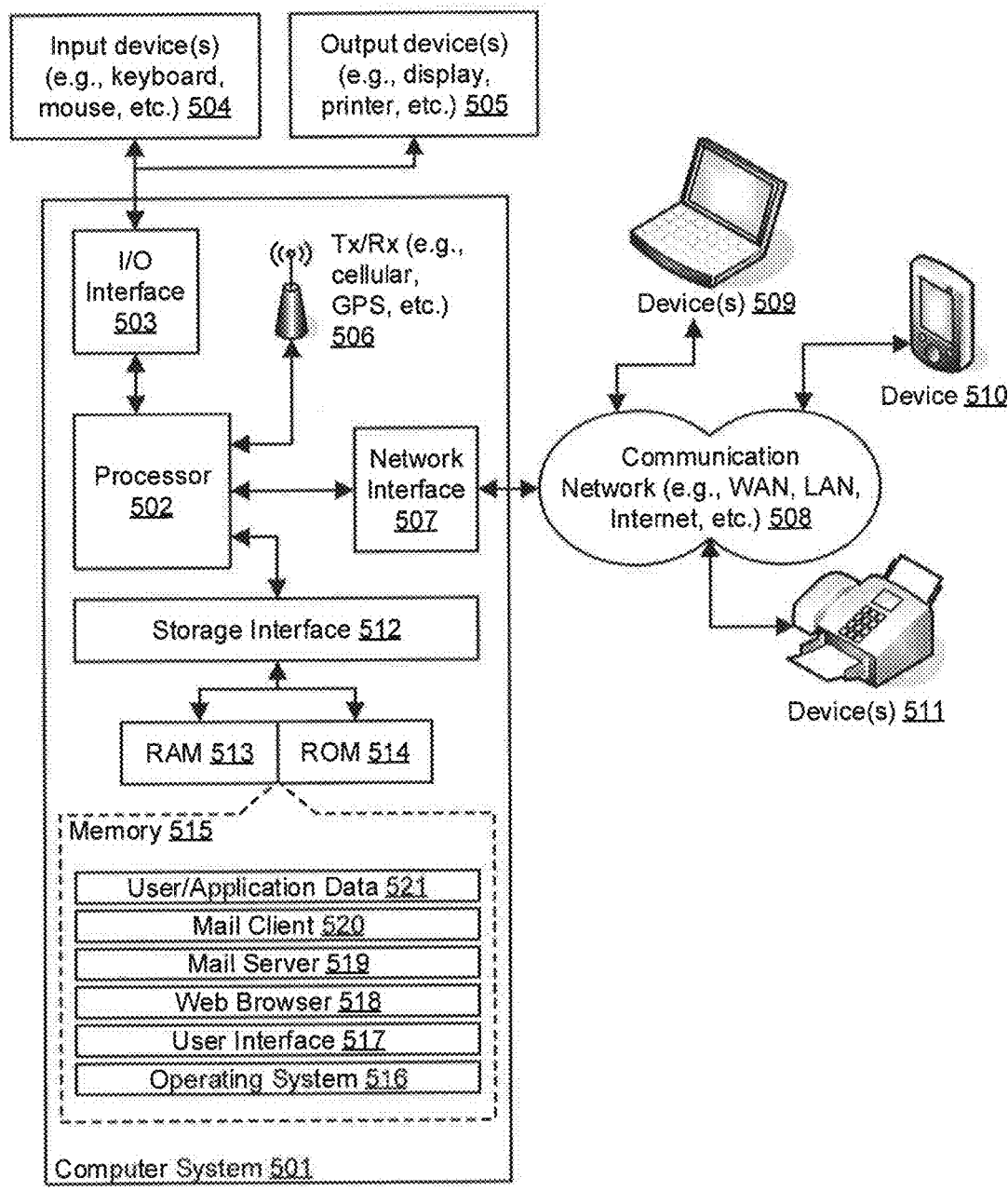
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the modules/components of the data classifier 102 presented in this disclosure. Computer system 501 may comprise a central processing unit ("CPU" or "processor") 502. Processor 502 may comprise at least one data processor for executing program components for executing user- or system-generated requests. A user may be a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 608 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++ IC#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for data cleansing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of data cleansing, the method comprising:
receiving, by a data categorizer, one or more data records pre-categorized into one or more categories;
identifying, by the data categorizer, at least one concept associated with the one or more data records;
grouping, by the data categorizer, the at least one concept associated with the one or more data records into a plurality of category lists based on the pre-categorized one or more categories associated with each of the one or more data records;
determining, by the data categorizer, one or more intersection sets based on a comparison between each pair of the plurality of category lists, wherein each intersection set comprises a set of one or more common concepts associated with a pair of category lists; and
replacing, by the data categorizer, each of at least one common concept of the set of one or more common concepts associated with the each intersection set by at least one category name based on an occurrence rate of the each of the at least one common concept of the set of one or more common concepts associated with the each intersection set, wherein replacing the each of the at least one common concept of the set of one or more common concepts associated with the each intersection set further comprises:
assigning an intensity of confusion value to the one or more intersection sets based on a confusion matrix;
identifying at least one intersection set from the one or more intersection sets having the intensity of confusion value higher than or equal to an intensity of confusion value of a largest intersection set; and
replacing the each of the at least one common concept of the set of one or more common concepts associated with the at least one intersection set by the at least one category name based on the occurrence rate of the each of the at least one common concept of the set of one or more common concepts associated with the at least one intersection set.

2. The method of claim 1, wherein the at least one concept comprises one or more words.

3. The method of claim 1, further comprising determining the largest intersection set from the one or more intersection sets, wherein the largest intersection set includes a highest number of common concepts.

4. The method of claim 3, wherein the highest number of common concepts is replaced by the at least one category name based on an occurrence rate of each of the highest number of common concepts associated with the largest intersection set.

5. The method of claim 1, wherein replacing the each of the at least one common concept of the set of one or more common concepts associated with the each intersection set comprises:
   generating the confusion matrix of the pre-categorized one or more data records;
   identifying, from the confusion matrix, an intersection set associated with a maximum confusion value; and
   replacing the each of the at least one common concept associated with the intersection set with the maximum confusion value by the at least one category name based on the occurrence rate of the each of the at least one common concept associated with the intersection set with the maximum confusion value.

6. The method of claim 1, wherein replacing the each of the at least one common concept of the set of one or more common concepts associated with the each intersection set further comprises:
   removing, by the data categorizer, the each of the at least one common concept of the set of one or more common concepts associated with the each intersection set from the one or more data records; and
   appending, by the data categorizer, the at least one category name to the one or more data records, for improved data classification, wherein the appending the category name further comprises:
      computing, by the data categorizer an occurrence rate of the each of the at least one common concept of the set of one or more common concepts associated with the each intersection set, wherein the occurrence rate of the each of the at least one common concept of the set of one or more common concepts associated with the each intersection set comprises the number of the plurality of category lists in which the each of the at least one common concept of the set of one or more common concepts associated with the each intersection set occurs; and
      appending, by the data categorizer the category name based on the number of the plurality of category lists and occurrence rate in the one or more data records, wherein the category name comprises name of the predefined category in which the each of the at least one common concept of the set of one or more common concepts associated with the each intersection set has the highest occurrence frequency, further wherein the occurrence frequency is the number of times, the each of the at least one common concept of the set of one or more common concepts associated with the each intersection set occurs in each of the plurality of category lists.

7. A system for data cleansing, comprising:
   a hardware processor; and
   a memory storing instructions executable by the hardware processor for:
   receiving, by a data categorizer one or more data records pre- categorized into one or more categories;
   identifying, by the data categorizer, at least one concept associated with the one or more data records;
   grouping, by the data categorizer, the at least one concept associated with the one or more data records into a plurality of category lists based on the pre-categorized one or more categories associated with each of the one or more data records;
   determining, by the data categorizer, one or more intersection sets based on a comparison between each pair of the plurality of category lists, wherein each intersection set comprises a set of one or more common concepts associated with a pair of category lists; and
   replacing, by the data categorizer, each of at least one common concept of the set of one or more common concepts associated with the each intersection set by at least one category name based on an occurrence rate of the each of the at least one common concept of the set of one or more common concepts associated with the each intersection set, wherein replacing the each of the at least one common concept of the set of one or more common concepts associated with the each intersection set further comprises:
   assigning an intensity of confusion value to the one or more intersection sets based on a confusion matrix;
   identifying at least one intersection set from the one or more intersection sets having the intensity of confusion value higher than or equal to an intensity of confusion value of a largest intersection set; and
   replacing the each of the at least one common concept of the set of one or more common concepts associated with the at least one intersection set by the at least one category name based on the occurrence rate of the each of the at least one common concept of the set of one or more common concepts associated with the at least one intersection set.

8. The system of claim 7, wherein the at least one concept comprises one or more words.

9. The system of claim 7, further comprising determining the largest intersection set from the one or more intersection sets, wherein the largest intersection set includes a highest number of common concepts.

10. The system of claim 9, wherein the highest number of common concepts is replaced by the at least one category name based on an occurrence rate of each of the highest number of common concepts associated with the largest intersection set.

11. The system of claim 7, wherein replacing the each of the at least one common concept of the set of one or more common concepts associated with the each intersection set comprises:
   generating the confusion matrix of the pre-categorized one or more data records;
   identifying from the confusion matrix, an intersection set associated with a maximum confusion value; and
   replacing the each of the at least one common concept associated with the intersection set with the maximum confusion value by the at least one category name based on the occurrence rate of the each of the at least one common concept associated with the intersection set with the maximum confusion value.

12. The system of claim 7, wherein replacing the each of the at least one common concept of the set of one or more common concepts associated with the each intersection set further comprises:
   removing, by the data categorizer, the each of the at least one common concept of the set of one or more common concepts associated with the each intersection set from the one or more data records; and appending, by the data categorizer, the at least one category name to the one or more data records, for improved data classification, wherein the appending the category name further comprises:

computing, by the data categorizer an occurrence rate of the each of the at least one common concept of the set of one or more common concepts associated with the each intersection set, wherein the occurrence rate of the each of the at least one common concept of the set of one or more common concepts associated with the each intersection set comprises the number of the plurality of category lists in which the each of the at least one common concept of the set of one or more common concepts associated with the each intersection set occurs; and appending, by the data categorizer the category name based on the number of the plurality of category lists and occurrence rate in the one or more data records, wherein the category name comprises name of the predefined category in which the each of the at least one common concept of the set of one or more common concepts associated with the each intersection set has the highest occurrence frequency, further wherein the occurrence frequency is the number of times, the each of the at least one common concept of the set of one or more common concepts associated with the each intersection set occurs in each of the plurality of category lists.

13. A non-transitory computer-readable medium storing instructions for data cleansing, wherein upon execution of the instructions by one or more processors, the processors perform operations comprising:

receiving one or more data records pre-categorized into one or more categories;

identifying at least one concept associated with the one or more data records;

grouping the at least one concept associated with the one or more data records into a plurality of category lists based on the pre-categorized one or more categories associated with each of the one or more data records;

determining one or more intersection sets based on a comparison between each pair of the plurality of category lists, wherein each intersection set comprises a set of one or more common concepts associated with a pair of category lists; and replacing each of at least one common concept of the set of one or more common concepts associated with the each intersection set by at least one category name based on an occurrence rate of the each of the at least one common concept of the set of one or more common concepts associated with the each intersection set, wherein replacing the each of the at least one common concept of the set of one or more common concepts associated with the each intersection set further comprises:

assigning an intensity of confusion value to the one or more intersection sets based on a confusion matrix;

identifying at least one intersection set from the one or more intersection sets having the intensity of confusion value higher than or equal to an intensity of confusion value of a largest intersection set; and replacing the each of the at least one common concept of the set of one or more common concepts associated with the at least one intersection set by the at least one category name based on the occurrence rate of the each of the at least one common concept of the set of one or more common concepts associated with the at least one intersection set.

14. The medium of claim 13, further comprising determining the largest intersection set from the one or more intersection sets, wherein the largest intersection set includes a highest number of common concepts.

15. The medium of claim 14, wherein the highest number of common concepts is replaced by the at least one category name based on an occurrence rate of each of the highest number of common concepts associated with the largest intersection set.

16. The medium of claim 13, wherein replacing the each of the at least one common concept of the set of one or more common concepts associated with the each intersection set comprises:

generating the confusion matrix of the pre-categorized one or more data records;

identifying, from the confusion matrix, an intersection set associated with a maximum confusion value; and replacing the each of the at least one common concept associated with the intersection set with the maximum confusion value by the at least one category name based on the occurrence rate of the each of the at least one common concept associated with the intersection set with the maximum confusion value.

17. The medium of claim 13, wherein replacing the each of the at least one common concept of the set of one or more common concepts associated with the each intersection set further comprises:

removing, by the data categorizer, the each of the at least one common concept of the set of one or more common concepts associated with the each intersection set from the one or more data records; and appending, by the data categorizer, the at least one category name to the one or more data records, for improved data classification, wherein the appending the category name further comprises:

computing, by the data categorizer an occurrence rate of the each of the at least one common concept of the set of one or more common concepts associated with the each intersection set, wherein the occurrence rate of the each of the at least one common concept of the set of one or more common concepts associated with the each intersection set comprises the number of the plurality of category lists in which the each of the at least one common concept of the set of one or more common concepts associated with the each intersection set occurs; and appending, by the data categorizer the category name based on the number of the plurality of category lists and occurrence rate in the one or more data records, wherein the category name comprises name of the predefined category in which the each of the at least one common concept of the set of one or more common concepts associated with the each intersection set has the highest occurrence frequency, further wherein the occurrence frequency is the number of times, the each of the at least one common concept of the set of one or more common concepts associated with the each intersection set occurs in each of the plurality of category lists.

\* \* \* \* \*